United States Patent [19]

Lesous et al.

[11] Patent Number: 4,463,236
[45] Date of Patent: Jul. 31, 1984

[54] ELECTRICAL APPARATUS, PARTICULARLY A RELAY OR A SMALL-SIZE CONTACTOR

[75] Inventors: Jean M. Lesous, Bonnes; Gérard Lerude, Antibes; Claude Julien, Thenezay, all of France

[73] Assignee: La Telemecanique Electrique, France

[21] Appl. No.: 418,342

[22] Filed: Sep. 14, 1982

[30] Foreign Application Priority Data

Sep. 15, 1981 [FR] France ............................ 81 17721

[51] Int. Cl.³ ............................................. H01H 9/00
[52] U.S. Cl. ................................. 200/295; 200/293; 361/355; 361/361; 339/198 GA
[58] Field of Search ............... 200/294, 295, 296, 303, 200/307, 293; 361/331, 346, 353–355, 358, 363, 376, 417, 419, 420, 427; 339/198 GA; 248/27.1, 27.3, 214, 220.2, 221.3, 221.4, 222.1, 295, 298

[56] References Cited

U.S. PATENT DOCUMENTS

| | | | |
|---|---|---|---|
| 3,943,412 | 3/1976 | Wickstrom | 361/331 |
| 4,067,529 | 1/1978 | Milcoy | 339/198 GA |
| 4,075,442 | 2/1978 | Fukada et al. | 200/303 X |
| 4,087,772 | 5/1978 | Grenier | 200/303 X |
| 4,111,517 | 9/1978 | Debaigt | 339/198 GA |
| 4,157,463 | 6/1979 | Fujita | 200/307 |

FOREIGN PATENT DOCUMENTS

| | | | |
|---|---|---|---|
| 2339905 | 2/1975 | Fed. Rep. of Germany | 339/198 GA |
| 2351530 | 4/1975 | Fed. Rep. of Germany | 339/198 GA |
| 2619506 | 11/1977 | Fed. Rep. of Germany | 339/198 GA |
| 2756237 | 7/1978 | Fed. Rep. of Germany | 361/363 |
| 2830362 | 1/1980 | Fed. Rep. of Germany | 361/376 |
| 2410207 | 7/1979 | France | 339/198 GA |
| 473489 | 7/1969 | Switzerland | 339/198 GA |
| 2023945 | 1/1980 | United Kingdom | 339/198 GA |

Primary Examiner—Stephen Marcus
Assistant Examiner—Ernest G. Cusick
Attorney, Agent, or Firm—William A. Drucker

[57] ABSTRACT

An electrical apparatus which can be dismantled and is adapted to be fitted onto a fixed standard-shaped rail or section.

The apparatus comprises a prism-shaped casing (50) having a rectangular opening (60) into which is accommodated a removable bottom (5) on the sides of which are provided means (25, 27) for fastening it to said casing and outer hooks (19, 20) adapted to cooperate with said shaped rail (2).

Such an apparatus is particularly advantageous when its dimensions approximate the transverse dimensions of the rail or section, as it is the case when a small-size contactor or a relay is to be fitted into the casing.

5 Claims, 6 Drawing Figures

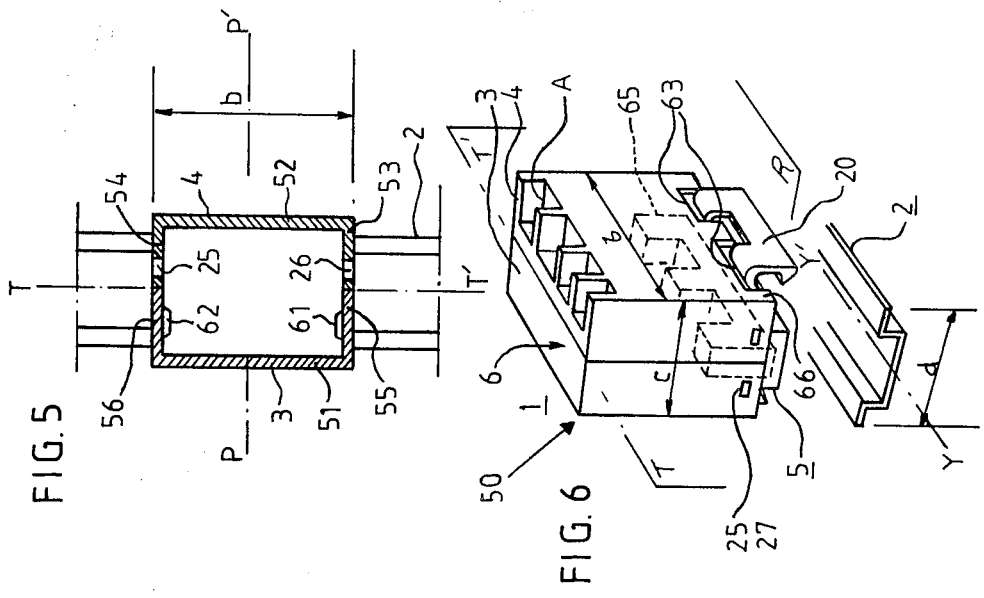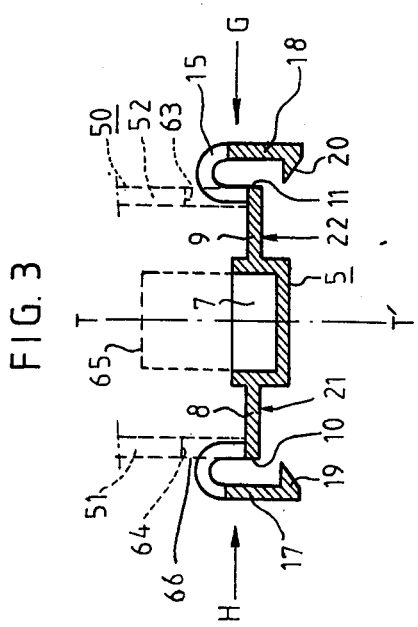

ELECTRICAL APPARATUS, PARTICULARLY A RELAY OR A SMALL-SIZE CONTACTOR

BACKGROUND OF THE INVENTION

The invention relates to an electrical apparatus, particularly a relay or a small-size contactor, comprising a hollow, prism-shaped casing adapted to accomodate a particular device and having a rectangular opening in a lower area thereof opposite to connection terminals, opening which is closed by a generally rectangularly-shaped removable bottom which is provided with fastening means adapted to cooperate with holding means on said casing and with removable hooking means which are disposed externally and are adapted to cooperate with a pair of parallel flanges of a fixed, metal shaped rail or section.

THE PRIOR ART

In a known apparatus having the same general construction as defined hereinabove, the cover is in the form of a bottom base having large dimensions so that the cover is to be fastened to side legs of the casing; such fastening means can not be used when the casing has small dimensions approximating the width of the shaped rail since the amount of material required for making the cover would render the cost of the cover prohibitive with respect to the relatively unimportant functions thereof.

OBJECT OF THE INVENTION

Accordingly, the object of the invention is to provide an electrical apparatus using a known general arrangement wherein means are provided to reduce the amount of plastic material necessary to make both the bottom and the casing.

Additional means for aiding the bottom engagement and improving stiffness of the casing-cover assembly will be specified hereinafter; indeed, althrough stiffness of structural parts increases at a relatively high rate with respect to the dimensions thereof when the latter decrease, it is important to pay particular attention to the phenomena of plastic flow which occur in plastic parts of small thickness, i.e. in plastic parts which are subjected to high pressure loads per surface unit.

SUMMARY OF THE INVENTION

In accordance with the invention, the above object is achieved due to the fact that said bottom, which is made from a thermoplastic material, has a pair of opposite side flanges or flaps of width less than the distance between a pair of first opposite side walls of the casing, which is also made from a thermoplastic material, towards which they extend, each of said flanges being provided with a pair of resilient arched parts which are connected to each other by a connecting strip or bar extending in a plane parallel to the plane in which said flanges extend and being provided with a first hooking hook adapted to cooperate with each of said flanges of said shaped rail or section, said bottom being further provided with second or fastening hooks adapted to copperate with other flanges in opposite lower areas of a pair of second side walls of said casing, which extend in a direction orthogonal to said first walls.

BEIEF DESCRIPTION OF THE DRAWINGS

Further features and auxiliary means of the invention for achieving additional results will be better understood from the following description of a preferred embodiment of the invention.

In the appended drawing:

FIG. 3 is a top view of the bottom in cross-section through a middle plane PP' perpendicular to TT';

FIG. 4 is an outer top view of the bottom;

FIG. 5 is a side view of the casing of the apparatus in cross-section through a plane SS'; and FIG. 6 is a perspective outer view of the apparatus in which the casing and the bottom are fastened to each other.

DESCRIPTION OF THE PREFERRED EMBODIMENT

Figure 1:
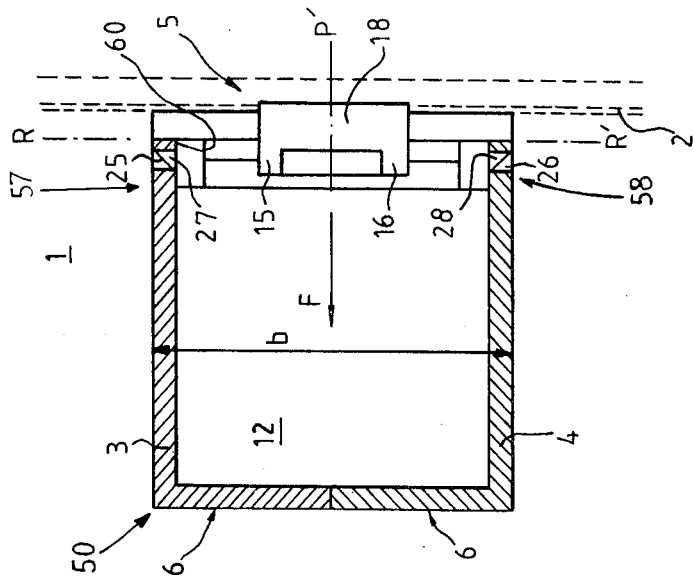
FIG. 1 is an elevation view of an apparatus in accordance with the invention partly in cross-section through the longitudinal plane of symmetry TT' of the apparatus and of the fastening rail.
Figure 2:
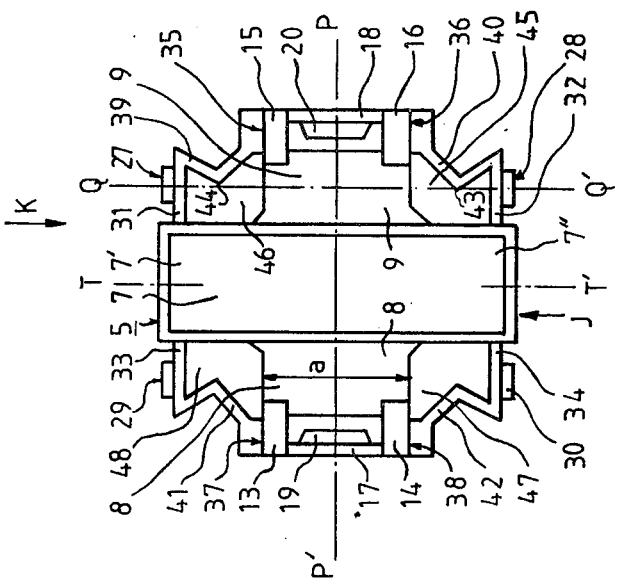
FIG. 2 is a side view of the removable bottom of the apparatus.

The electrical apparatus 1 as shown in cross-sectional view through plane PP' of FIG. 2, which may be a small-size contactor, a relay or any small or medium size apparatus, includes a casing adapted to be fitted after closure thereof an a standard cover shaped rail or section 2 and comprising a housing or casing 50 mainly consisting of a pair of casing halves 3,4 symmetrically disposed on opposite sides of a middle plane TT' and a bottom 5 opposite to front side 6 of the casing which is usually provided with connection terminals and serves as a cover (see FIGS. 1 and 6, in which the bottom is not shown in cross-section). The casing may alternatively consist of a single part having thin walls. It should be noted that plane TT' is also perpendicular to the plane in which flanges 23, 24 of said section extend and passes through longitudinal axis YY' of the section.

At least some of the internal parts of the apparatus are inserted into said housing in the direction of arrow F after said removable bottom 5 has been removed, and then said bottom is fitted again into rectangular opening 60 of the casing which is adapted to accomodate it.

FIG. 2 shows a left-hand view of bottom 5 (i.e. viewed in a direction opposite to arrow F) mainly comprising a housing 7 parallel to plane TT' (holding or aiding in holding e.g. the fixed armature 65 of an electromagnet of a relay located therein) and having a pair of flanges 8,9 intergral with said housing and disposed on opposite sides thereof (see FIG. 6). Each of said flanges including at its free end 10, 11 respectively, a pair of resiliently flexible attached parts 13, 14 and 15, 16, respectively, is of a width a less than the distance or width b between opposite walls 51, 52 of the casing towards which it extends (see also FIG. 1).

The ends of said arched parts which extend towards the bottom of the drawing, i.e. in the direction opposite to inner space 12 and to side 6 of the apparatus are connected to each other by a connecting strip or a connecting bar 17, 18, respectively, said connecting strips being both parallel to a middle plane RR' extending parallel to said section and in which are located bottom 5 and lower areas 58, 57 of the casing in which opening 60 is provided.

Each of said connecting strips is provided with a hook 19, 20, respectively, on its surface facing towards middle plane TT'.

Said hooks 19, 20 serve, in conjunction with outer surfaces 21, 22 of said flanges (see FIG. 4) to provide fastening of the apparatus to flanges 23, 24 of said standard section 2.

As shown in FIG. 1, each casing half 3, 4 is provided with notches such as 25, 26 into which hooks 27, 28, 29 and 30 integral with bottom 5 can engage. Said notches have flanges extending towards the left side in FIG. 1, which could as well be provided on inner projections such as 61, 62.

Said hooks serving for snapping and removable fastening of said bottom are each provided on a portion 31, 32, 33, 34 of a resilient material which is integrally formed with said housing and are disposed at opposite ends 7', 7" thereof.

Said portions of resilient material extend in a direction parallel to said flanges and are connected with movable areas of said flexible arched parts as shown at 35, 36, 37, 38 through other portions 39, 40, 41, 42 each forming an angular portion or projecting bend such as 43, 44 which extends parallel to said housing 7 and is located in a space such as 45, 46, respectively, between a flange such as 9 and two walls 31, 32, respectively. Said portions of material are thus movable in plane RR' when a load is applied thereto in this plane.

When bottom 5 is fitted into opening 60 in the housing 3, 4 or casing 50, hooks 27, 28, 29 and 30 move backwards and then engage into notches such as 25 or 26 or come across projections 61, 62; such a backward movement is made possible by the bent shape of portions 39, 40, 41, 42.

When the apparatus is brought forward in the direction opposite to arrow F onto a cover section 2, hooking hooks 19, 20 move backwards and outwardly due to resiliency of arched parts 13, 14, 15, 16 and to presence of inclined ramps disposed in a known manner on outer surfaces of the hooking hooks.

Such a backward movement results in movement of areas 35, 36, 37, 38 which causes portions 39, 40, 41, 42 to be flexed or deformed in a direction opposite to the above deformation, so that engagement of hooks 27, 28, 29 and 30 into said notches or onto said projections is rendered firmer and said bottom becomes quite rigidly secured to said casing. Such a result is important because, when the apparatus and the section are voluntarily separated, hooks 20, 19 must be open so as to prevent any undesired separation of bottom 5 and casing 3, 4; moreover, continuous transmission of a load to hooks 27 . . . 30 after snapping onto the section allows compensation of any plastic flow of the bottom or casing material.

The removable bottom can be withdrawn from the casing, once the apparatus has been separated from the section, by applying a pressure load on connecting strips 17, 18 in the direction of arrows G and H; such load indeed causes portions of material 39, 40, 41 42 to be moved and bent such that walls 31, 32, 33, 34 become resiliently deformed inwardly in the direction of arrows K and J, and hooks 27, 28, 29, 30 become disengaged from said notches or projections, which greatly helps one to remove said bottom, e.g. for exchanging an electromagnet coil.

The junction plane of the two casing halves 3, 4 passes, in cases where the casing is made of two parts, through plane TT' so that the loads applied in the lateral direction (i.e. in directions opposite to arrows J and K) by fastening hooks 27, 28, 29, 30 do not reinforce the load forces in the transverse direction (i.e. directions opposite to arrows G and H) to flex or open lower areas 57, 58 of the casing; the latter will preferably be provided with clearances such as 63, 64 in lower area 66 adjacent to opening 60 through which the arched parts extend so as to prevent the latter from contacting the casing, thus providing a more compact construction and thence minimizing the amount of necessary material.

The above removable bottom device is particularly advantageous where the transverse dimensions c of the casing are approximately the same as the transverse dimensions d of the section.

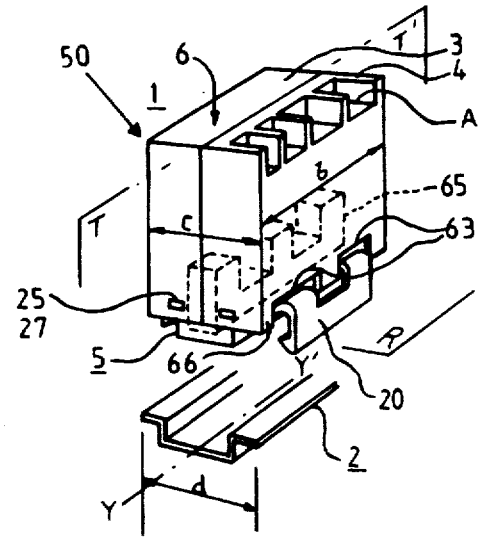

We claim:

1. An electrical apparatus which can be dismantled and is adapted to be fitted onto a fixed shaped metal rail provided with a pair of parallel flanges, said apparatus comprising a hollow casing adapted to accomodate an electrical device connected to connection terminals and a removable bottom, said hollow casing having at least two first opposite side walls distant from each other by a distance (b), two second opposite side walls extending perpendicularly to the two first side walls, a rectangular opening located in the lower area of the hollow casing opposite to the said connection terminals and flanges located in opposite lower areas of said two second opposite side walls of the hollow casing which extend in a direction orthogonal to said two first side walls, the said removable bottom being made of thermoplastic material, presenting a generally rectangular form in order to close said rectangular opening and comprising a pair of opposite flanges extending in a same plane and having a width (a) less than the distance (b) between the said two first opposite side walls of said casing, which is also made from a thermoplastic material, towards which they extend, each of said flanges being provided with a pair of resilient arched parts which are connected with each other by a connecting strip extending in a plane (R) parallel to the plane in which said flanges extend, and each of said connecting strips being provided with a first hooking means adapted to cooperate with each of said flanges of said fixed shaped metal rail, said removable bottom being further provided with second fastening hooks adapted to cooperate in a locking arrangement with flanges provided in opposite lower areas of the two second side walls of said casing.

2. An electrical apparatus according to claim 1; in which said removable bottom further comprises a central housing having at least two pairs of opposite sides for aiding in fastening elongated members within said apparatus and in which said first hooking means and said second fastening hooks are located on opposite sides of said central housing and are resiliently movable in first and second mutually perpendicular directions.

3. An electrical apparatus according to claim 2, in which said resilient arched parts of said flanges comprise movable areas connected with walls which are provided with said second fastening hooks through portions of flexible material each of which defines an angular portion facing said housing and which are located between walls and one of the corresponding said opposite flanges of the bottom so that the application of opposite pulling forces onto said first hooking means in said first direction to open said first hooking means causes said second fastening hooks to move away from each other through translational motions along the said second direction, and application of opposite pressure forces onto said first hooking means in said first direction cause said second fastening hooks to draw nearer to each other through translational opposite motions along the said second direction.

4. An electrical apparatus according to claim 1, in which said casing consists of a pair of casing halves joined to each other along a junction plane passing through said housing and extending parallel to a longitudinal axis of said shaped rail, each of said casing halves being provided, in inwardly extending, opposite transverse walls, with notches and projections having flanges which cooperate with said second fastening hooks.

5. An electrical apparatus according to claim 1, in which lower areas of said casing adjacent to said opening are provided with clearances in which portions of said flexible arched parts partially extend.

* * * * *

UNITED STATES PATENT AND TRADEMARK OFFICE
CERTIFICATE OF CORRECTION

PATENT NO. : 4,463,236

DATED : July 31, 1984

INVENTOR(S) : Jean M. Lesous, et al

Page 1 of 2

It is certified that error appears in the above-identified patent and that said Letters Patent is hereby corrected as shown below:

The title page should be deleted to appear as per the attached title page.

Signed and Sealed this

Fourteenth Day of May 1985

[SEAL]

Attest:

DONALD J. QUIGG

Attesting Officer

Acting Commissioner of Patents and Trademarks

United States Patent [19]

Lesous et al.

[11] Patent Number: 4,463,236
[45] Date of Patent: Jul. 31, 1984

[54] ELECTRICAL APPARATUS, PARTICULARLY A RELAY OR A SMALL-SIZE CONTACTOR

[75] Inventors: Jean M. Lesous, Bonnes; Gérard Lerude, Antibes; Claude Julien, Thenezay, all of France

[73] Assignee: La Telemecanique Electrique, France

[21] Appl. No.: 418,342

[22] Filed: Sep. 14, 1982

[30] Foreign Application Priority Data

Sep. 15, 1981 [FR] France .................. 81 17721

[51] Int. Cl.³ .................................. H01H 9/00
[52] U.S. Cl. .................................. 200/295; 200/293; 361/355; 361/361; 339/198 GA
[58] Field of Search ............. 200/294, 295, 296, 303, 200/307, 293; 361/331, 346, 353–355, 358, 363, 376, 417, 419, 420, 427; 339/198 GA; 248/27.1, 27.3, 214, 220.2, 221.3, 221.4, 222.1, 295, 298

[56] References Cited

U.S. PATENT DOCUMENTS

| 3,943,412 | 3/1976 | Wickstrom | 361/331 |
| 4,067,529 | 1/1978 | Milcoy | 339/198 GA |
| 4,075,442 | 2/1978 | Fukada et al. | 200/303 X |
| 4,087,772 | 5/1978 | Grenier | 200/303 X |
| 4,111,517 | 9/1978 | Debaigt | 339/198 GA |
| 4,157,463 | 6/1979 | Fujita | 200/307 |

FOREIGN PATENT DOCUMENTS

| 2339905 | 2/1975 | Fed. Rep. of Germany | 339/198 GA |
| 2351530 | 4/1975 | Fed. Rep. of Germany | 339/198 GA |
| 2619506 | 11/1977 | Fed. Rep. of Germany | 339/198 GA |
| 2756237 | 7/1978 | Fed. Rep. of Germany | 361/363 |
| 2830362 | 1/1980 | Fed. Rep. of Germany | 361/376 |
| 2410207 | 7/1979 | France | 339/198 GA |
| 473489 | 7/1969 | Switzerland | 339/198 GA |
| 2023945 | 1/1980 | United Kingdom | 339/198 GA |

*Primary Examiner*—Stephen Marcus
*Assistant Examiner*—Ernest G. Cusick
*Attorney, Agent, or Firm*—William A. Drucker

[57] ABSTRACT

An electrical apparatus which can be dismantled and is adapted to be fitted onto a fixed standard-shaped rail or section.

The apparatus comprises a prism-shaped casing (50) having a rectangular opening (60) into which is accommodated a removable bottom (5) on the sides of which are provided means (25, 27) for fastening it to said casing and outer hooks (19, 20) adapted to cooperate with said shaped rail (2).

Such an apparatus is particularly advantageous when its dimensions approximate the transverse dimensions of the rail or section, as it is the case when a small-size contactor or a relay is to be fitted into the casing.

5 Claims, 6 Drawing Figures